United States Patent [19]

Pun et al.

[11] 4,190,702
[45] Feb. 26, 1980

[54] BATTERIES

[76] Inventors: Ching W. Pun; Ching C. Poon, both of On Shing Industrial Bldg. 9th Fl., Fo Tan, S.T.T.L. #7, Shatin, New Territories, Hong Kong

[21] Appl. No.: 930,166

[22] Filed: Aug. 2, 1978

[30] Foreign Application Priority Data

Aug. 11, 1977 [GB] United Kingdom ............... 33775/77

[51] Int. Cl.² .................. H01M 2/00; H01M 6/42
[52] U.S. Cl. ....................... 429/4; 429/159; 429/163; 429/157
[58] Field of Search ............. 429/157, 156, 159, 158, 429/160, 163, 167, 1, 4, 9, 96–100

[56] References Cited

U.S. PATENT DOCUMENTS

| 1,613,327 | 1/1927 | Meisekothen | 429/159 |
| 3,575,725 | 4/1971 | Kaye | 429/157 |
| 3,655,452 | 4/1972 | Cich | 429/159 |
| 3,657,021 | 4/1972 | Mathews | 429/157 X |
| 3,660,169 | 5/1972 | Clune et al. | 429/159 |
| 3,794,525 | 2/1974 | Kaye | 429/159 X |
| 3,801,373 | 4/1974 | Spellman | 429/86 |
| 3,887,394 | 6/1975 | Kaye | 429/159 X |
| 4,007,060 | 2/1977 | Sorenson et al. | 429/53 |
| 4,091,187 | 5/1978 | Kaye | 429/159 |
| 4,123,598 | 10/1978 | Hammel | 429/159 |

*Primary Examiner*—Anthony Skapars
*Attorney, Agent, or Firm*—Bacon & Thomas

[57] ABSTRACT

An electrical battery having unscaled dry cells enclosed in a two-part housing split along a plane that is parallel to the axes of the cells.

7 Claims, 6 Drawing Figures

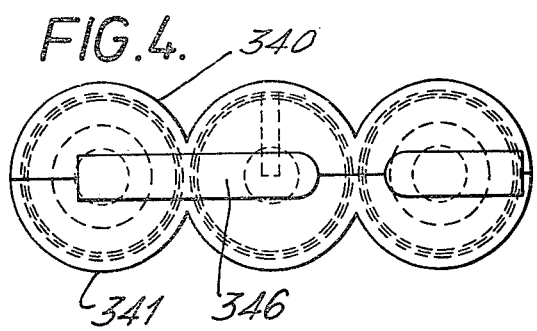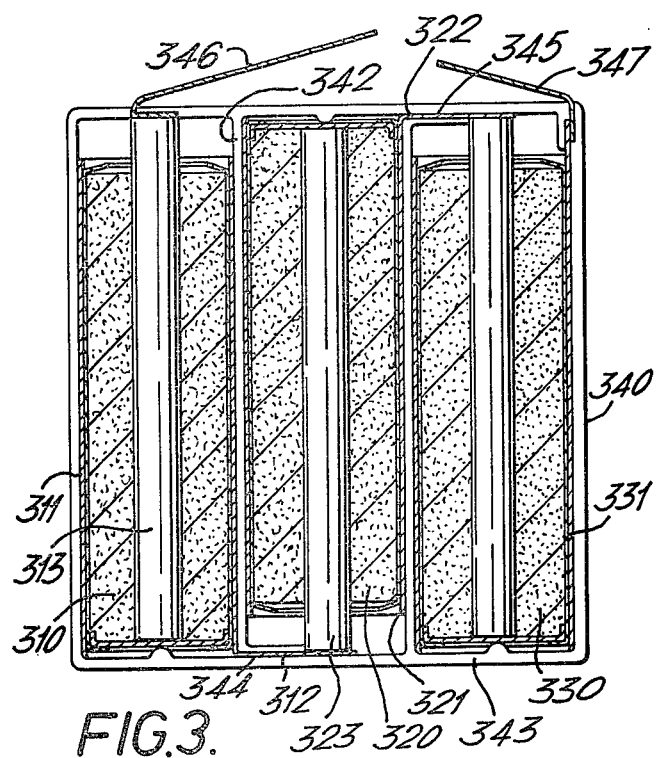

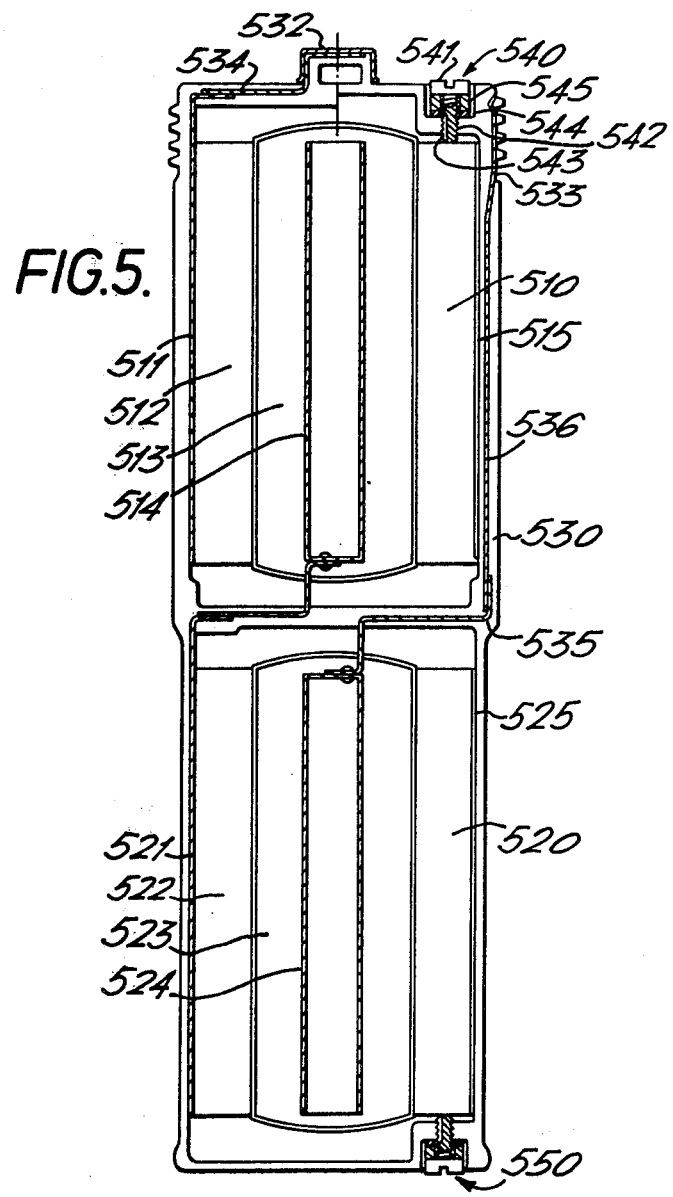

BATTERIES

This invention relates to electrical batteries comprising two or more dry cells.

A conventional dry leclanche type cell has a zinc negative electrode, an electrolyte, a depolarising dolly, and a carbon positive electrode, the cell being sealed to prevent egress of excess electrolyte, fluid and the like.

To obtain higher voltages and/or currents than obtainable with a single cell, it is common to use a number of cells connected in series and/or parallel, and often these are enclosed in a single casing. This has the disadvantage that each cell is first individually sealed, and then further enclosing means has to be provided for the whole battery: this involves considerable expense in manufacturing steps and raw materials, and the sealing and casing components can take up valuable space.

According to the invention, there is provided an electrical battery comprising a plurality of substantially cylindrical unsealed dry cells enclosed in a single sealed container comprising at least two parts made of a substantially rigid plastics material joined together along at least one plane parallel to the axes of the cells.

The individual cells may be single or multiple dry cells of the lechanche type, having a carbon positive electrode, depolariser, electrolyte, and a zinc negative electrode. The zinc negative electrode, since it does not perform a sealing function, may be in the form of an open-ended cylinder and may, if desired, be of a thickness such that, when the cell voltage has fallen below a predetermined value substantially all the zinc has been used up. However, the invention is equally applicable to other types of single or multi dry type cells.

The container for the cells may be of any suitable plastics material, provided, of course, that it is resistant to chemical attack by the electrolyte or any products of electrolysis of the cells, and provides adequate insulation. Suitable materials include rigid nylon, polyethylene, polyproplene, polyvinyl chloride and copolymers thereof.

The container is formed in two or more parts which are then joined together to seal the cells within; the use of ultrasonic welding is preferred, although other means —e.g. R.F. welding or adhesives may be used.

The cells may be arranged end-to-end and/or side-by side within the container as desired, and may be connected in series to produce a higher voltage than a single cell, or in parallel to provide greater capacity and lower internal resistance (It is preferred that, for the leclanche type of dry cell, with manganese dioxide depolariser, to minimise internal resistance, the distance between the carbon rod and zinc negative electrode does not exceed a predetermined dimension-for increased capacity, parallel connection of two or more cells is preferable to increasing the cell size). Where the cells are series connected, it is necessary to provide a seal between one cell and another to prevent short-circuits, and this may conveniently be achieved by forming dividing walls between cells integrally with the casing.

Inter-connections between the cells are preferably located within the container, and conveniently parts of the container may be provided with slots in which conductive interconnecting strips may be located prior to assembly of the container so that, on assembly, the strips are at least partially enclosed within the wall of the container and thus protected from attack e.g. by electrolyte. Conveniently the faces of two parts which are to be joined together may have a pair of complementary opposing slots which together form a single duct when the parts are joined. Connections between the cells and the connection terminals may be made in similar manner. Connections which pas through the wall of the container to the exterior are preferably sealed with a suitable sealing material.

In the case where compression of the contents of the cell is required, as with the leclanche dry cell, where compression of the depolarising dolly assists in ensuring a low internal resistance, this may conveniently be achieved by employing a negative electrode in the form of an open-ended zinc cylinder (as mentioned above), the cylinder being slit longitudinally so as to be radially compressible. The assembled unsealed cell can then be arranged to have outside dimensions slightly larger than the corresponding inside dimensions of the container so that the cell and hence the depolariser is compressed as the parts of the container are pressed together for joining.

Some embodiments of the invention will now be described, by way of example only, with reference to the accompanying drawings, in which:

FIGS. 2 and 3 are views similar to FIG. 1 showing different arrangements of cells;

FIG. 4 is a plan view of the battery of FIG. 3;

FIG. 5 is a longitudinal cross-section of a battery according to another embodiment of the invention.

Figure 1:
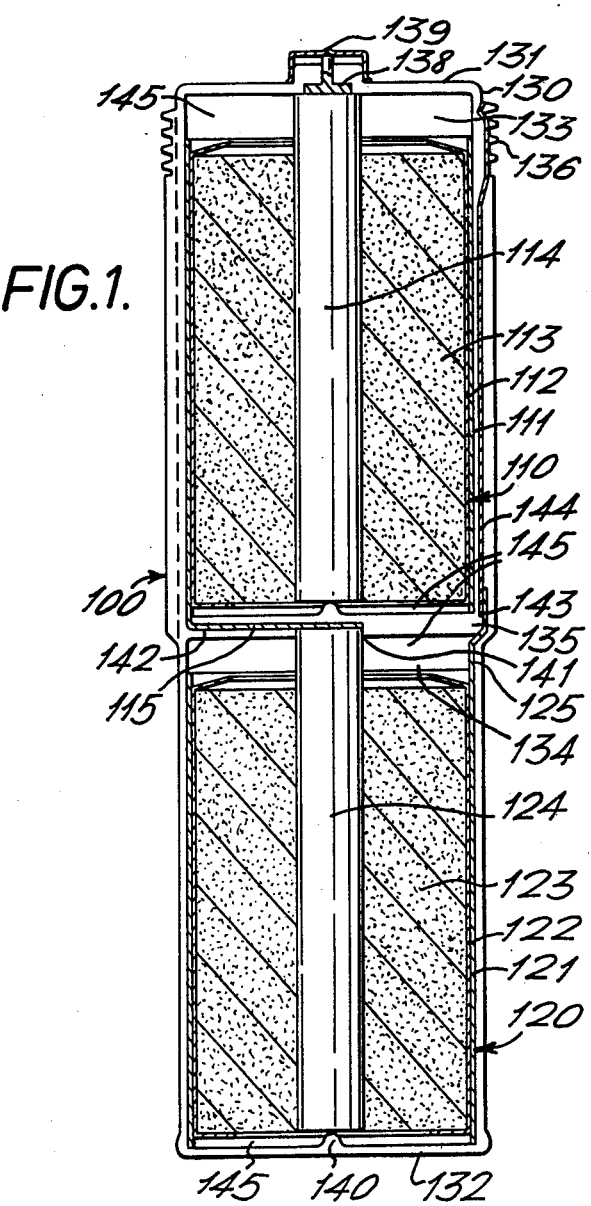
FIG. 1 is a longitudinal cross-section of a battery according to one embodiment of the invention, before final joining of the container.

Referring to FIG. 1, a battery 100 contains two dry leclanche cells 110, 120 connected in series, each cell comprising a zinc negative electrode 111, 121, an electrolyte paste impregnated paper lining 112, 122, a depolarising dolly 113, 123, and a carbon positive electrode 114, 124 of generally conventional construction. The negative electrodes 111, 121 are each in the form of an open-ended cylinder having a longitudinal slit (not shown). The zinc cylinder 111 has a connecting strip 115 projecting from its lower end, whilst the zinc cylinder 121 has a similar connecting strip 125 projecting from its upper end.

The two cells are located within a cylindrical casing, of injection moulded nylon, comprising two identical halves, only one of which 130 is shown in FIG. 1. The casing has end walls 131, 132 and has two cylindrical compartments 133, 134, separated by a dividing wall 135, and is provided at its end adjacent the end wall 131 with a screw thread 136 whereby it may be screwed into an electrical appliance—e.g. a flashlight head. The cell 110 is positioned in the compartment 133: the lower end of its carbon rod 114 is located by a projection 137 on the dividing wall 135 whilst the upper end is connected to a metal connecting member 138 in end wall 131 and a metal terminal cap 139. The cell 120 is located in the second compartment 134 by a projection 140 on the end wall 132, and its carbon rod is located in a recess 141 in the dividing wall 135, where it makes electrical contact with the connecting strip 115 of the cell 110. This connecting strip is located in slots 142 formed in the opposing faces of the two halves of the dividing wall 135.

Similarly, the connecting strip 125 of the cell 120 is located in slots 143 in the opposing faces of the side wall of the casing, where it contacts a further strip 144 also located in slots 143. The strip 144 extends to the end of the casing and terminates in a groove at the base of the threads of the screw thread 136, to form the negative terminal of the battery. Alternatively, of course, the strip 144 could be formed integrally with the strip 125.

Spaces 145 are provided within the casing to accommodate liquid generated internally.

Figure 2:
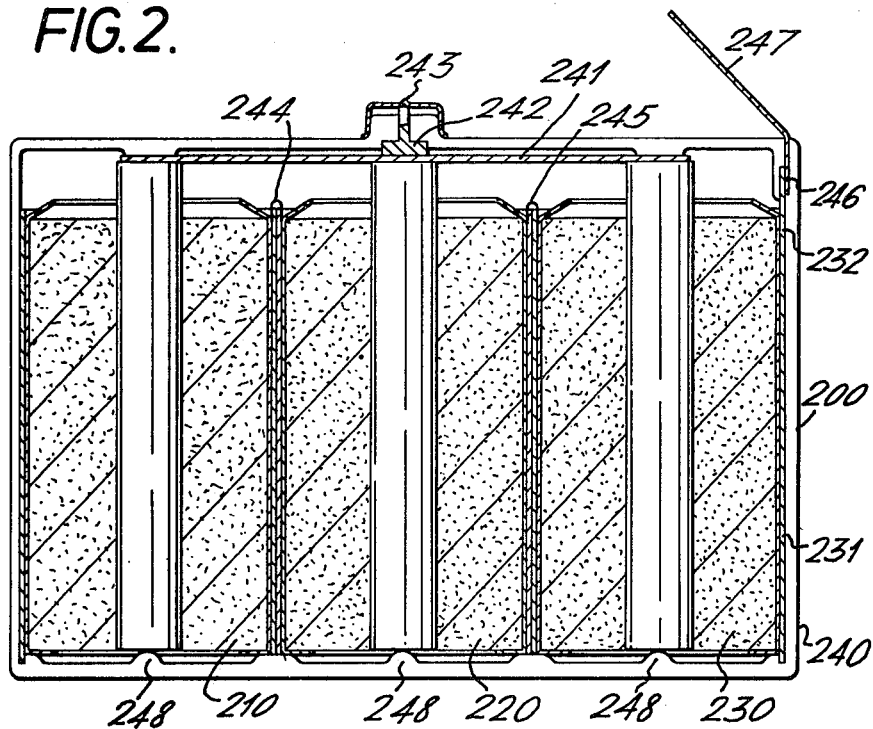

In the arrangement shown in FIG. 2, a battery 200 has three dry cells 210, 220, 230, similar to the cells of FIG. 1, arranged in side by side relationship within an outer casing of plastics material comprising two identical halves only one of which 240 is shown. The cells are connected in parallel, the positive electrodes being connected together by means of a bar 241 which is connected to a member 242 and terminal cap 243 located in the top of the container: the negative electrodes are arranged to stay together to conduct electric current but if necessary the negative electrodes are connected together by means of clips 244, 245. The negative electrode 231 of the cell 230 has an extension 232 located in complementary slots 246 in the casing where it is connected to a strip 247 which extends outside the casing to form the negative terminal of the battery. As in FIG. 1, the casing has projections 248 to provide space below the cells.

In FIG. 3 is shown a similar arrangement to that shown in FIG. 2; in this embodiment, however, cells 310, 320, 330 are connected in series, and the casing, formed in two halves 340, 341 (see FIG. 4), has dividing walls 342, 343 between the cells. The negative electrodes 311, 321 of cells 310, 320 are formed with extensions 312, 322 which pass through slots 344, 345 in the casing, in the manner previously described in connection with FIG. 1, to contact the carbon rod positive electrodes 323, 333 of cells 320 and 330. The central cell 320 is inverted with respect to the other cells to reduce the required length of the extensions 312, 322. The positive electrode 313 of cell 310 and the negative electrode 331 of cell 330 are provided with connection strips 346, 347 which pass through the casing to form the positive and negative terminals of the battery.

In FIG. 5 is shown a battery comprising two alkaline dry cells 510, 520, each having a positive electrode 511, 521, depolariser 512, 522, electrolyte 513, 523, and negative electrode 514, 524. Each positive electrode is in the form of an open-ended tube having a longitudinal slit 515, 525. The two cells are arranged end-to-end and connected in series by means of a conductive strip 531. The cells are enclosed in an outer casing comprising two halves one of which 530 is shown in the drawing.

The casing is generally as described in connection with FIG. 1, with the exception of the optional pressure valves 540, 550 which will now be described in detail.

The pressure valve 540 comprises a screw 541 located in a threaded hole 542 in the casing. The screw has a longitudinal groove 543 along part of its length, whilst between the casing and the head of the screw are located a plastics washer 544 and rubber washer 545 which is compressed to urge the plastics washer adjacent the casing thus preventing escape of gas from within the casing. However, when the pressure within the casing exceeds a predetermined limit, the internal pressure forces the plastics washer outward, against the compressive force of the rubber washer, thus permits gas to escape, releasing the internal pressure. The other pressure valve 550 is of identical construction.

Connections to a positive terminal 532 and negative terminal 533 are made by conductive strip 534 and conductive strips 535 and 536 which are located in slots in the casing as described in connection with FIG. 1.

Figure 6:
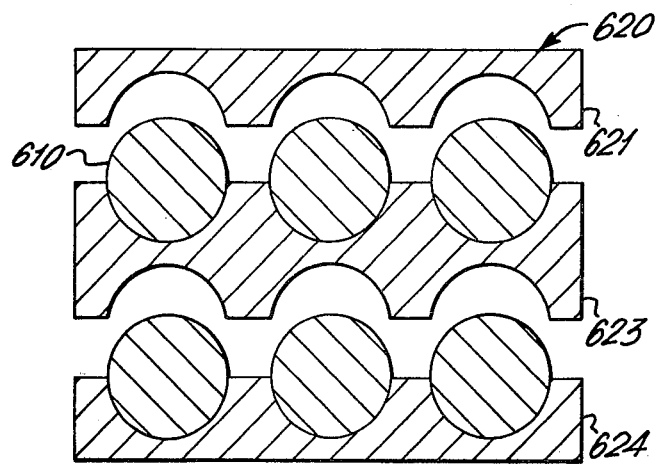
FIG. 6 is a schematic transverse cross-section of the battery of a further embodiment.

FIG. 6 shows schematically another arrangement in which six cells, 610, which may be of any desired type, are located in a casing 620 having three parts 621, 622, 623.

We claim:

1. An electrical battery comprising a plurality of substantially cylindrical unsealed dry cells enclosed in a single sealed container comprising at least two parts made of a substantially rigid plastics material joined together along at least one plane parallel to the axes of the cells.

2. A battery as claimed in claim 1, wherein said parts of the container are joined together by ultrasonic welding.

3. A battery as claimed in claim 1 or 2, wherein the container comprises dividing walls between the cells formed integrally with the container.

4. A battery as claimed in any preceding claim, wherein the connections between cells are made internally of the container.

5. A battery as claimed in claim 4, wherein the container is provided with slots in which conductive strips for connecting the cells within the container and/or the cells to the terminals are located.

6. A battery as claimed in claim 5, wherein the slots substantially encase the conductive strips.

7. A battery as claimed in claim 6, wherein at least two of the faces of the parts of the container to be joined together have a slot therein, the slots cooperating to form one or more ducts for the conductive strips.

* * * * *